US010807916B2

(12) United States Patent
Liang et al.

(10) Patent No.: US 10,807,916 B2
(45) Date of Patent: Oct. 20, 2020

(54) MODIFIED BARIUM TITANATE FOAM CERAMIC/THERMOSETTING RESIN COMPOSITES AND PREPARATION METHOD THEREOF

(71) Applicant: SOOCHOW UNIVERSITY, Suzhou (CN)

(72) Inventors: Guozheng Liang, Suzhou (CN); Longhui Zheng, Suzhou (CN); Aijuan Gu, Suzhou (CN); Bihuan Peng, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 212 days.

(21) Appl. No.: 16/069,163

(22) PCT Filed: Nov. 29, 2016

(86) PCT No.: PCT/CN2016/107799
§ 371 (c)(1),
(2) Date: Jul. 10, 2018

(87) PCT Pub. No.: WO2017/121204
PCT Pub. Date: Jul. 20, 2017

(65) Prior Publication Data
US 2019/0016644 A1 Jan. 17, 2019

(30) Foreign Application Priority Data
Jan. 11, 2016 (CN) .......................... 2016 1 0014634

(51) Int. Cl.
*C04B 41/45* (2006.01)
*C08G 59/68* (2006.01)
*C04B 35/468* (2006.01)
*C08G 59/40* (2006.01)
*C04B 41/52* (2006.01)
*C04B 41/90* (2006.01)
*C04B 35/636* (2006.01)
*C04B 35/634* (2006.01)
*C08G 59/50* (2006.01)
*C04B 38/06* (2006.01)
*C04B 41/00* (2006.01)
*C04B 41/48* (2006.01)
*C04B 41/83* (2006.01)
*C08J 5/24* (2006.01)

(52) U.S. Cl.
CPC ...... *C04B 41/4523* (2013.01); *C04B 35/4682* (2013.01); *C04B 35/6365* (2013.01); *C04B 35/63424* (2013.01); *C04B 38/0615* (2013.01); *C04B 41/009* (2013.01); *C04B 41/4853* (2013.01); *C04B 41/52* (2013.01); *C04B 41/83* (2013.01); *C04B 41/90* (2013.01); *C08G 59/4028* (2013.01); *C08G 59/5073* (2013.01); *C08G 59/686* (2013.01); *C08J 5/24* (2013.01); *C04B 2235/408* (2013.01); *C04B 2235/5454* (2013.01); *C04B 2235/6028* (2013.01); *C04B 2235/616* (2013.01); *C04B 2235/6562* (2013.01); *C04B 2235/6567* (2013.01); *C08J 2363/00* (2013.01)

(58) Field of Classification Search
CPC .................................................. C04B 41/4523
USPC ....................................................... 427/376.1
See application file for complete search history.

(56) References Cited

U.S. PATENT DOCUMENTS

| | | | | |
|---|---|---|---|---|
| 3,090,094 A | * | 5/1963 | Schwartzwalder .... | B01D 39/20 264/628 |
| 4,024,212 A | * | 5/1977 | Dore ....................... | C04B 35/10 264/44 |
| 4,707,311 A | * | 11/1987 | Okazaki ............... | C04B 35/4684 264/43 |
| 5,443,746 A | * | 8/1995 | Harris ................. | C04B 35/4682 252/62.54 |

FOREIGN PATENT DOCUMENTS

| | | |
|---|---|---|
| CN | 1556781 A | 12/2004 |
| CN | 102372499 A | 3/2012 |
| CN | 102952368 * | 3/2013 |

(Continued)

OTHER PUBLICATIONS

Zarkoob, An investigation on mechanical behavior of barium titanate foam with hydroxyapatite coating, Ceramics International, vol. 38, Issue 4, May 2012, p. 3445-3451 (Year: 2012).*
Zarkoob, An investigation on mechanical behavior of barium titanate foam with hydroxyapatite coating, Ceramics International 38 (2012), p. 3445-3451 (Year: 2012).*

*Primary Examiner* — Tabatha L Penny
(74) *Attorney, Agent, or Firm* — SZDC Law PC (57) ABSTRACT

In a method of preparing a modified barium titanate foam ceramic/thermosetting resin composite material, an organic additive is used as an auxiliary; deionized water is used as a solvent; nanometer barium titanate is used as a ceramic raw material; and these components are mixed and grounded to form a slurry. A pre-treated polymer sponge is impregnated in the slurry for slurry coating treatment and a barium titanate foam ceramic is obtained after drying and sintering. Then, through dopamine modification, micrometer/nanometer silver is deposited in situ on a skeleton surface. A resin, which is in the molten state and is thermosettable, is immersed into pores of the modified barium titanate foam ceramic, and the modified barium titanate foam ceramic/thermosetting resin composite material is obtained after a thermosetting treatment.

8 Claims, 5 Drawing Sheets

(56) References Cited

FOREIGN PATENT DOCUMENTS

| | | |
|---|---|---|
| CN | 102952368 A | 3/2013 |
| CN | 104530616 A | 4/2015 |
| CN | 105419328 A | 3/2016 |
| EP | 0667324 A1 | 8/1995 |
| WO | WO1992018213 * | 10/1992 |

* cited by examiner

MODIFIED BARIUM TITANATE FOAM CERAMIC/THERMOSETTING RESIN COMPOSITES AND PREPARATION METHOD THEREOF

This application is a the national stage of PCT/CN2016/107799, filed on Nov. 29, 2016, which claims priority to Chinese Patent Application No. 201610014634.1, filed Jan. 11, 2016, which is incorporated by reference for all purposes as if fully set forth herein.

FIELD OF THE INVENTION

The present invention relates to a kind of composites and preparation method thereof, and particularly relates to a kind of modified barium titanate foam ceramic/thermosetting resin composites and preparation method thereof.

BACKGROUND OF THE INVENTION

With the rapid development of the electric and electronic industries, an increasing need for materials with high dielectric constant is increasing. Dielectric ceramic has high dielectric constant as well as good ferroelectric, piezoelectric and insulation properties, and thus has become an important species among high dielectric constant materials. However, due to its disadvantages such as heavy weight, poor adhesion, brittleness and rigorous processing condition, it is restricted in practical application.

Polymers usually have excellent process feature and mechanical properties, but their dielectric constants are low (<10), and thus cannot be directly used as materials high dielectric constants, researchers improve the dielectric properties of the polymer matrix by adding functional fillers, and then get a material with high dielectric constant. Ceramic/polymer composites combine the advantages of excellent dielectric properties of ceramics as well as good adhesion, toughness and processability of polymers, and these composites have good abilities of storing electric energy and balancing the distribution of the electric field, moreover, their dielectric constants are not greatly dependent on temperature and frequency, so these composites are ideal materials for application in cutting-edge fields. However, in order to obtain desired dielectric properties, the volume contents of ceramic particles in these composites should be higher than 50 vol %, this makes composites are more difficult to be processed, their dielectric losses are enlarger, weights increase, meanwhile toughness and adhesions decrease. In addition, the uneven dispersion of ceramics in the polymer, especially, when the volume percentage of the dispersed phase is high, tends to produce local aggregates, and then an intact interface cannot be formed, resulting in the decrease of the dielectric constant.

At present, the introduction of conductive particles as a third component into ceramic/polymer composite using percolation theory can significantly reduce the content of ceramics. However, the uneven dispersion of conductive particles in the system often leads to a higher dielectric loss. After summarizing the existing technologies, it can be found that how to make full use of the percolation phenomenon to integrate the good process and toughness of a polymer with high dielectric properties of dielectric ceramics is still a meaningful and challenging project.

SUMMARY OF THE INVENTION

The present invention deals with solving problems of available technologies, and providing a kind of modified barium titanate foam ceramic/thermosetting resin composites with high dielectric constant and low dielectric loss, and preparation method that is simple and controllable thereof.

To achieve above purpose, the present invention adopts the following technical solution:

A preparation method of modified barium titanate foam ceramic/thermosetting resin composites, wherein comprising the following steps:

(1) by weight, 100 parts of nano barium titanate and 30 to 120 parts of an aqueous solution of organic binder with a concentration of 1 to 15 wt % are sufficiently ground to obtain a slurry A; 10 to 80 parts of an aqueous solution of organic rheological agent with a concentration of 0.5 to 3 wt % are added into the slurry A, and the mixture is sufficiently ground to obtain a slurry B; 20 to 80 parts of an aqueous solution of organic dispersant with a concentration of 0.5 to 3 wt % are added into the slurry B, and the mixture is sufficiently ground to obtain a slurry C; said organic binder is one or more selected from polyvinyl alcohol, carboxymethyl cellulose and methyl cellulose; said organic rheological agent is one or more selected from carboxymethyl cellulose and hydroxyhexyl cellulose; said organic dispersant is one or more selected from polyacrylamide, polyethyleneimine and polyacrylic acid amine;

(2) a polymer sponge having a specification of 15 to 35 PPI is soaked in an aqueous solution of sodium hydroxide with a concentration of 5 to 20 wt %, and then heated up to 50 to 75° C. and keeping at that temperature for 2 to 6 h, the polymer sponge is taken out and washed with deionized water, followed by drying to obtain a polymer sponge D; at room temperature, the polymer sponge D is soaked in an aqueous surfactant solution with a concentration of 0.5 to 3 wt % for 2 to 6 h, then took out and remove the excess surfactant, after dried at 40 to 80° C., a pretreated polymer sponge E is obtained; the polymer material of said polymer sponge is selected from polyurethane, polystyrene, or polyvinyl chloride; said surfactant is one or more selected from carboxymethyl cellulose and polyethyleneimine;

(3) said pretreated polymer sponge E is soaked in the slurry C prepared in step (1), and maintained for 1 to 10 min at room temperature, after hanging pulp, the excess slurry in the sponge is removed by extrusion, and the sponge is dried at 40 to 80° C.; repeating processes of hanging pulp and drying for 1 to 7 times, a green body of foam ceramics based on barium titanate is obtained;

(4) said green body of barium titanate foam ceramics prepared in step (3) is heated from room temperature to 100-300° C. at a rate of 0.5-5° C./min, and then heated to 500-700° C. at a rate of 0.5-5° C./min and maintained at that temperature for 0.5-2 h, followed by continuously heating to 1000-1500° C. at a rate of 2-10° C./min and keeping at that temperature for 1-5 h, after the furnace is cooled to room temperature, barium titanate foam ceramics are obtained;

(5) using buffering agent or buffer, water and dopamine hydrochloride to prepare dopamine aqueous solution with a concentration of 0.5-10 g/L; of which pH value is adjusted to 8.3-8.8 with alkali to obtain solution F; barium titanate foam ceramics prepared in step (4) are soaked in solution F and kept at room temperature for 1 to 24 h, followed by washing with deionized water and drying successively, to obtain dopamine-modified barium titanate foam ceramics;

(6) by volume, 4 to 20 parts of stabilizer aqueous solution with a concentration of 0.1-1 wt % are added into 100 parts of a fresh ammoniacal silver solution with a concentration of 0.03-0.3 mol/L, the mixture is uniformly mixed to obtain solution G; the dopamine-modified barium titanate foam ceramics prepared in step (5) are soaked in solution G and kept at room temperature for 0.5-24 h to obtain barium titanate foam ceramics loaded with nano silver, into which 50-300 parts of reducing agent aqueous solution having a concentration of 1-30 g/L are added and kept at room temperature for 0.1-5 h, followed by washing with deionized water and drying successively, to obtain modified barium titanate foam ceramics; said stabilizer is one or more selected from polyvinylpyrrolidone and sodium alginate; said reducing agent is one or more selected from hydrazine hydrate, sodium citrate, sodium borohydride, glucose and ascorbic acid;

(7) a molten and thermocurable resin is poured into the modified barium titanate foam ceramics prepared in step (6), after the pores of foam ceramic are fully permeated with the resin, thermocuring and postprocessing are conducted, and a modified barium titanate foam ceramic/thermosetting resin composite is obtained.

In the present invention, the average diameter of said nano barium titanate is less than or equal to 100 nm.

Said buffering agent or buffer is selected from Tris-HCl, or disodium hydrogen phosphate-sodium dihydrogen phosphate buffer.

Said alkali is selected from sodium hydroxide, or aqueous ammonia solution.

In the technical solution of this invention, the process conditions of thermocuring and postprocessing are consistent with those of the thermocurable resin used. The thermosetting resin is a resin which can be self-cured by heat, or a resin system composed of curing agent and resin which cannot be self-cured by heat. The resin which can be self-cured by heat is one or more selected from bismaleimide resin and cyanate ester resin. The resin which cannot be self-cured by heat is epoxy resin.

The technical solution of the present invention also comprises a kind of modified barium titanate foam ceramic/thermosetting resin composites obtained by using above mentioned preparation method.

The volume percentage of the resin in the composite is from 60% to 90%.

Compared with the prior arts, this invention has following advantages:

1. The modified barium titanate foam ceramics are used as functional fillers in this invention, which are prepared through using micro/nano silver supported on pure barium titanate foam ceramics with a single chemical composition. For them, barium titanate foam ceramics consist of pure barium titanate with a single chemical composition, which has excellent dielectric properties; moreover, further ceramization of the foam ceramic is conducted through sintering at high temperature, exhibiting a higher dielectric constant. On the other hand, foam ceramics are loaded with silver through the entire network, this is helpful to construct conductive network in composite, so that the composite has high dielectric constant.

2. In the preparation of modified barium titanate foam ceramics, dopamine and the existence of loaded Ag particles change the morphology and chemical structure of the skeleton of barium titanate foam ceramics, a good interaction between the foam ceramics and the resin is obtained, so the resultant composites have outstanding performances.

3. In this invention, barium titanate foam ceramics with high dielectric constant and three-dimensional network are used as the skeleton, and the nano silver is in situ loaded on the foam ceramic skeleton through utilizing the strong adhesion and self-reducing property of dopamine, followed by reduction with the reduction agent, the preparation is green, simple and controllable.

4. For modified barium titanate foam ceramic/thermosetting resin composites provided in this invention, micro/nano silver particles are evenly in situ deposited on the skeleton of barium titanate foam ceramic, the nano silver particles (which are not conductive) hinder the formation of conductive network, this reduces the contact among conductive particles and causes conduction loss, so the prepared composites have low dielectric loss. Meanwhile, micro/nano silver particles are deposited on the surfaces of foam ceramics, improving the interface between ceramic and resin.

5. The method for preparing modified barium titanate foam ceramic/thermosetting resin composites provided in this invention is simple, controllable, green, environmental friendly, and has wide applicability, so which is suitable for industrial production.

DETAILED DESCRIPTION OF THE INVENTION

The technical solution of this invention is further described by combining concrete drawings, embodiments and control examples as follows.

Embodiment 1

1) Preparation of Slurries 20 g of barium titanate (the average diameter is 100 nm) and 10 g of aqueous polyvinyl alcohol solution with a concentration of 10 wt % were sufficiently ground to obtain a slurry A; 5 g of aqueous carboxymethyl cellulose solution with a concentration of 2 wt % was added into the slurry A, and the mixture was sufficiently ground to obtain a slurry B; 10 g of aqueous polyacrylamide solution with a concentration of 1 wt % was added into the slurry B, and the mixture was sufficiently ground to obtain a slurry C.

2) Treatment of Polyurethane Sponge

The polyurethane sponge having a specification of 25 PPI was soaked in an aqueous sodium hydroxide solution with a concentration of 15 wt %, and then heated up to 60° C. and keeping at that temperature for 3.5 h; the polyurethane sponge was taken out and washed with deionized water, followed by drying to obtain a polyurethane sponge D; at room temperature, the polyurethane sponge D was soaked in an aqueous carboxymethyl cellulose solution with a concentration of 1 wt % for 3 h; then took out and removed the excess carboxymethyl cellulose solution, after dried at 60° C., a pretreated polyurethane sponge E was obtained.

3) Preparation of Green Body of Barium Titanate Foam Ceramics

The pretreated polyurethane sponge E was soaked in the slurry C prepared in step 1) and maintained for 5 min at room temperature; after hanging pulp, the excess slurry in the sponge was removed by extrusion, and the sponge was dried at 40° C.; repeating processes of hanging pulp and drying for 4 times, a green body of foam ceramics based on barium titanate with even coating and no blocks was obtained.

4) Preparation of Barium Titanate Foam Ceramics

Figure 1:
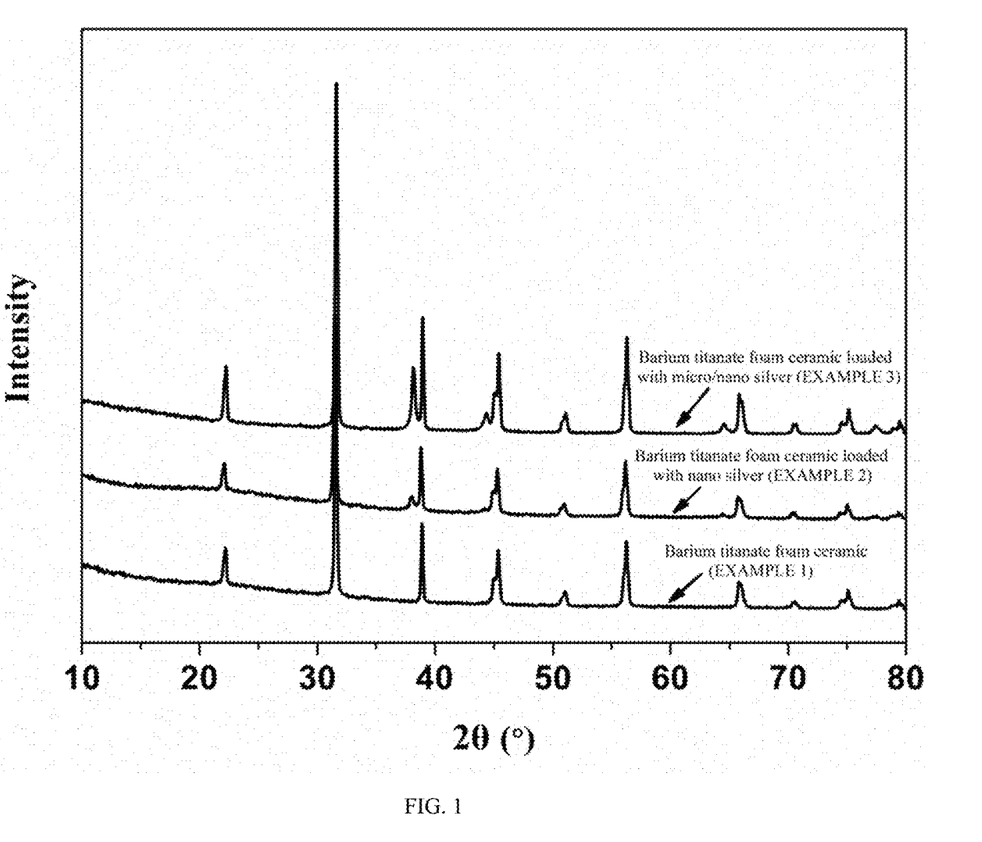
FIG. 1 is X-ray diffraction patterns of barium titanate foam ceramic prepared in EMBODIMENT 1 of this invention, barium titanate foam ceramic loaded with nano silver prepared in EMBODIMENT 2, and barium titanate foam ceramic loaded with micro/nano silver prepared in EMBODIMENT 3.

The green body of barium titanate foam ceramics prepared in step 3) was heated from room temperature to 200° C. at a rate of 2° C./min, and then raised to 600° C. at a rate of 1° C./min and maintained at 600° C. for 1 h; followed by continuously heating to 1200° C. at a rate of 5° C./min and keeping at that temperature for 2 h; after the furnace was cooled to room temperature, barium titanate foam ceramics were obtained. Its X-ray diffraction pattern and scanning electron microscope image are shown in FIGS. 1 and 2, respectively.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with sodium hydroxide; barium titanate foam ceramics prepared in step 4) were soaked in solution F and kept at room temperature for 24 h, followed by washing with deionized water for several times and drying, successively, to obtain dopamine-modified barium titanate foam ceramics. Its scanning electron microscope image is shown in FIG. 2.

Figure 2:
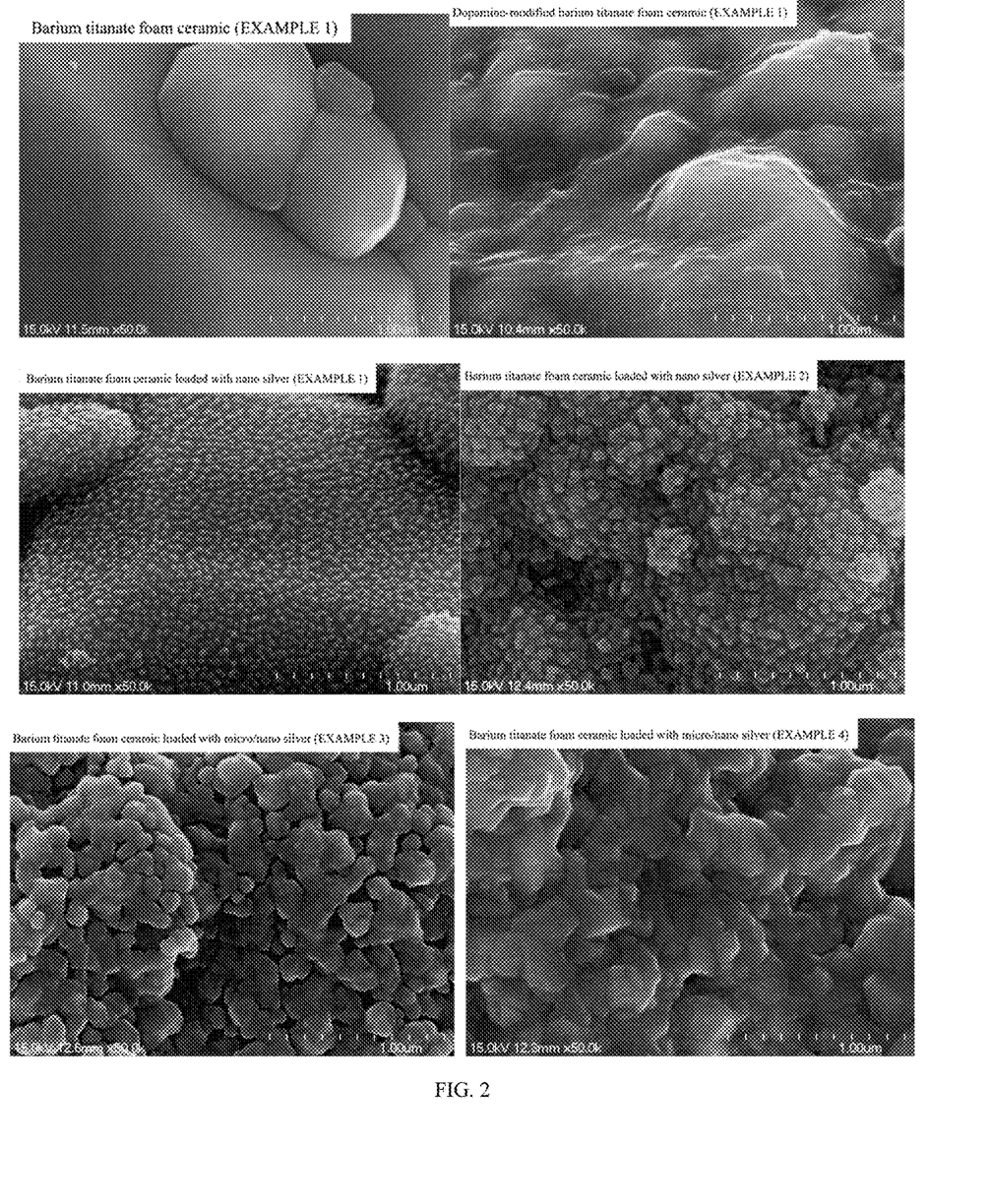
FIG. 2 is scanning electron microscope images (×50,000) of barium titanate foam ceramic, dopamine-modified barium titanate foam ceramic and barium titanate foam ceramic loaded with nano silver prepared in EMBODIMENT 1 of this invention, barium titanate foam ceramic loaded with nano silver prepared in EMBODIMENT 2, and barium titanate foam ceramics loaded with micro/nano silver prepared in EMBODIMENTS 3 and 4.

6) Preparation of Barium Titanate Foam Ceramics Loaded with Micro/Nano Silver 5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) were soaked in solution G and kept at room temperature for 2 h to obtain barium titanate foam ceramics loaded with nano silver, its scanning electron microscope image is shown in FIG. 2; then, 100 mL of aqueous sodium borohydride solution with a concentration of 1 g/L was added into the solution G and kept at room temperature for 2 h; followed by washing with deionized water and drying, successively, to obtain barium titanate foam ceramics loaded with micro/nano silver, that is modified barium titanate foam ceramics.

7) Preparation of Modified Barium Titanate Foam Ceramic/Cyanate Ester Resin Composite The modified barium titanate foam ceramics prepared in step 6) were placed in a mold and preheated at 160° C. in an oven; 2,2-bis(4-cyanatophenyl)propane (bisphenol A cyanate ester) was melted at 160° C. for 1 h to obtain an solution, which was poured into the preheated modified barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, modified barium titanate foam ceramic/cyanate ester resin composite was obtained.

Embodiment 2

1) Preparation of Barium Titanate Foam Ceramics Loaded with Micro/Nano Silver 5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) of EMBODIMENT 1 were soaked in solution G and kept at room temperature for 24 h to obtain barium titanate foam ceramics loaded with nano silver, its X-ray diffraction pattern and scanning electron microscope image are shown in FIGS. 1 and 2, respectively; then, 100 mL of aqueous glucose solution with a concentration of 20 g/L was added into the solution G and kept at room temperature for 0.1 h; followed by washing with deionized water and drying, successively, to obtain barium titanate foam ceramics loaded with micro/nano silver, that is modified barium titanate foam ceramics.

2) Preparation of Modified Barium Titanate Foam Ceramic/Cyanate Ester Resin Composite The modified barium titanate foam ceramics prepared in step 1) were placed in a mold and preheated at 160° C. in an oven; bisphenol A cyanate ester was melted at 160° C. for 1 h to obtain an solution, which was poured into the preheated modified barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, modified barium titanate foam ceramic/cyanate ester resin composite was obtained.

Embodiment 3

1) Preparation of Barium Titanate Foam Ceramics Loaded with Micro/Nano Silver 5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) of EMBODIMENT 1 were soaked in solution G and kept at room temperature for 1 h to obtain barium titanate foam ceramics loaded with nano silver; then, 100 mL of aqueous glucose solution with a concentration of 20 g/L was added into the solution G and kept at room temperature for 1.5 h; followed by washing with deionized water and drying, successively, to obtain barium titanate foam ceramics loaded with micro/nano silver, that is modified barium titanate foam ceramics. Its X-ray diffraction pattern and scanning electron microscope image are shown in FIGS. 1 and 2, respectively.

Figure 3:
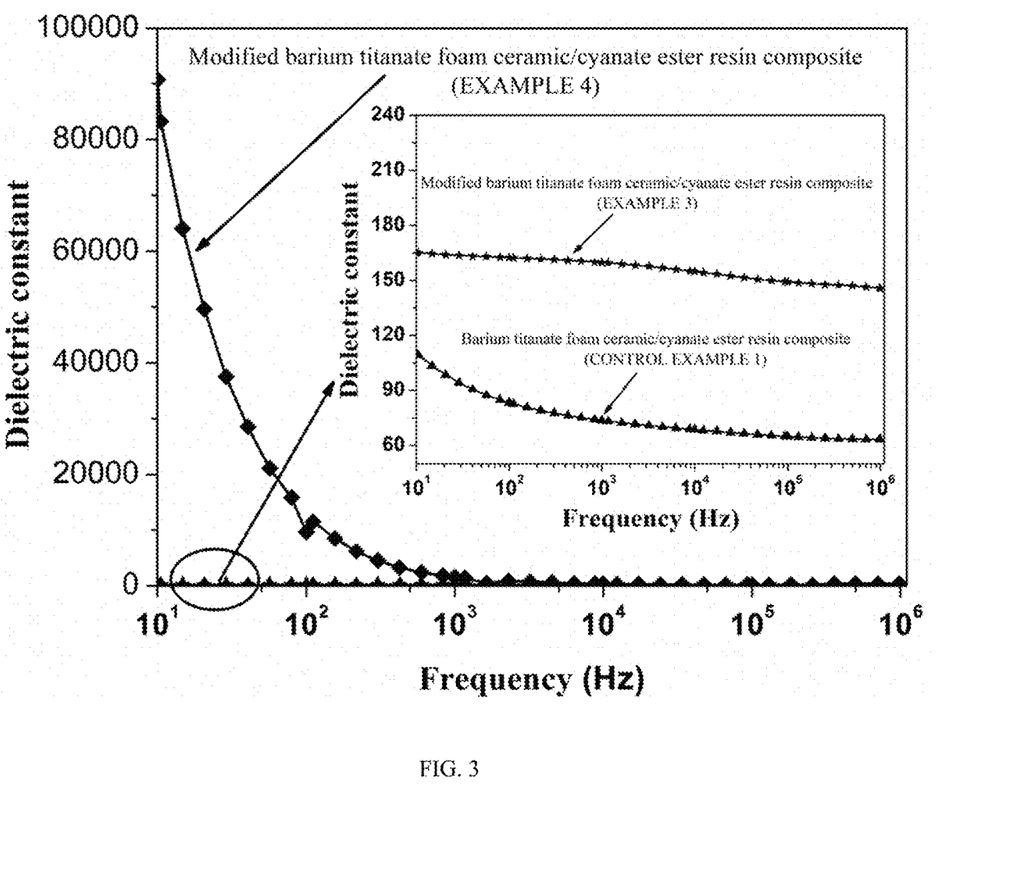
FIG. 3 is plots reflecting frequency dependence of dielectric constant of modified barium titanate foam ceramic/cyanate ester resin composites prepared in EMBODIMENTS 3 and 4 of this invention, and barium titanate foam ceramic/cyanate ester resin composite prepared in CONTROL EXAMPLE 1.
Figure 4:
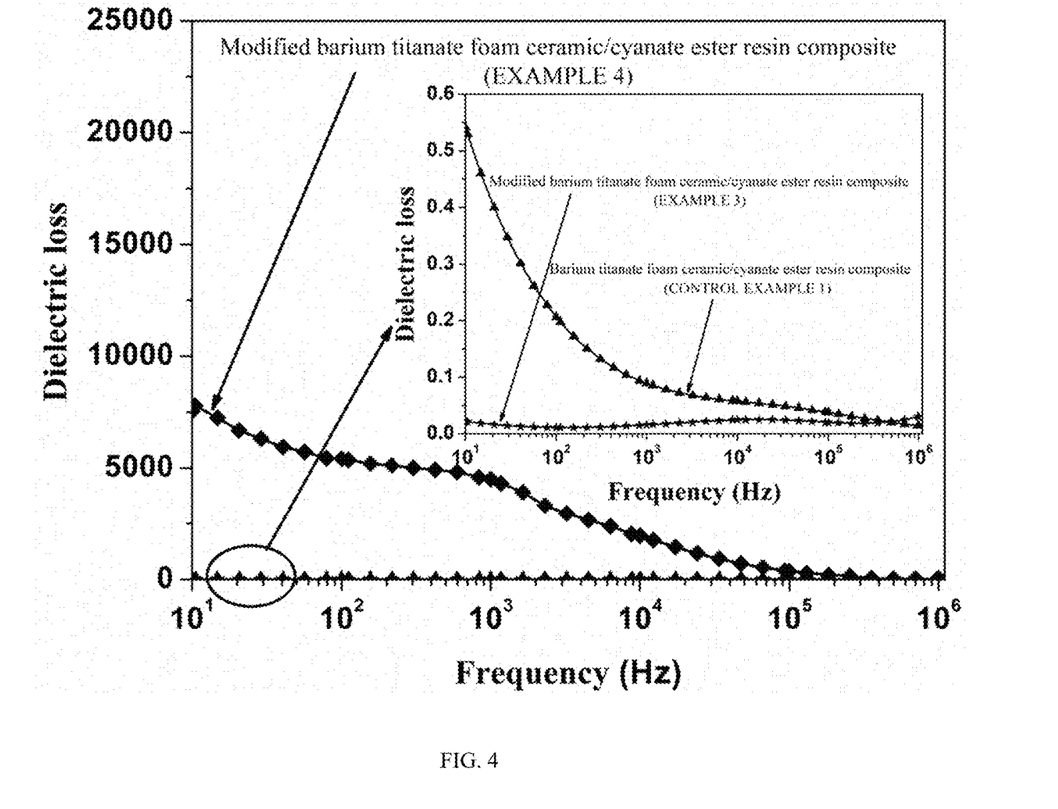
FIG. 4 gives plots reflecting frequency dependence of dielectric loss of modified barium titanate foam ceramic/cyanate ester resin composites prepared in EMBODIMENTS 3 and 4, and barium titanate foam ceramic/cyanate ester resin composite prepared in CONTROL EXAMPLE 1.
Figure 5:
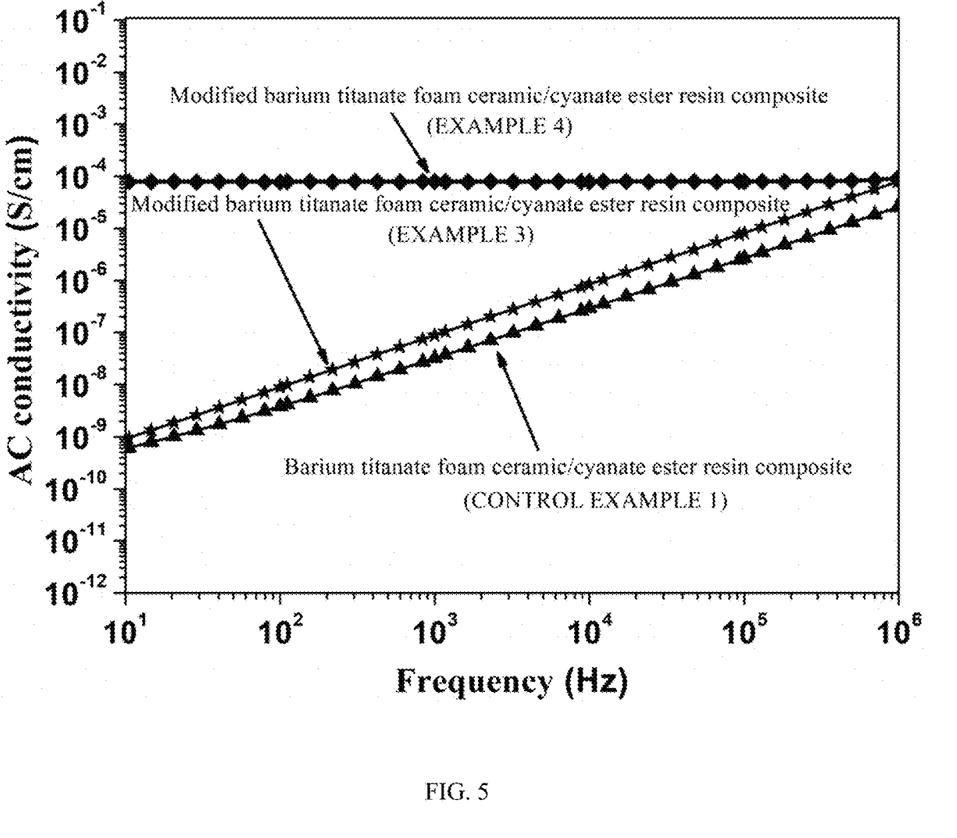
FIG. 5 is plots reflecting frequency dependence of AC conductivities of modified barium titanate foam ceramic/cyanate ester resin composites prepared in EMBODIMENTS 3 and 4, and barium titanate foam ceramic/cyanate ester resin composite prepared in CONTROL EXAMPLE 1.

2) Preparation of Modified Barium Titanate Foam Ceramic/Cyanate Ester Resin Composite The modified barium titanate foam ceramics prepared in step 1) were placed in a mold and preheated at 160° C. in an oven; bisphenol A cyanate ester was melted at 160° C. for 1 h to obtain an solution, which was poured into the preheated modified barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, modified barium titanate foam ceramic/cyanate ester resin composite was obtained. Its plots reflecting frequency dependence of dielectric constant, dielectric loss and AC conductivity are shown in FIGS. 3, 4 and 5, respectively.

FIG. 1 displays X-ray diffraction patterns of barium titanate foam ceramic prepared in EMBODIMENT 1 of this invention, barium titanate foam ceramic loaded with nano silver prepared in EMBODIMENT 2 and barium titanate foam ceramic loaded with micro/nano silver prepared in EMBODIMENT 3. It can be seen that nano barium titanate exhibits significant diffraction peaks at 22.1°, 31.6°, 38.9°, 45.2°, 50.8°, 56.1°, 65.8°, 70.2°, 74.6° and 78.9°, corresponding to crystal planes of (100), (110), (111), (002)/(200), (210), (211), (220), (221), (310) and (113) (JCPDS No. 5-0626), respectively. Whether 20 at 45.2° is split into two diffraction peaks or not is an effective evidence for judging the crystalline form of barium titanate. Since the barium titanate foam ceramics prepared in EMBODIMENT 1 exhibit a split peak at 45.2°, it can be judged that the barium titanate foam ceramic prepared in EMBODIMENT 1 contains cubic and tetragonal phases. In addition, no other impurity peaks are found. Compared to barium titanate foam ceramics (EMBODIMENT 1), there are four significant diffraction peaks exhibiting at 38.1°, 44.3°, 64.5° and 77.4° after loaded with micro/nano silver, corresponding to crystal planes of (111), (200), (220) and (311) (JCPDS No. 04-0783), respectively. It can be judged that the particles loaded in EMBODIMENTS 2 and 3 are face-centered cubic silver. At the same time, the diffraction peak of barium titanate foam ceramics loaded with micro/nano silver is enhanced by further reduction using glucose solution.

Embodiment 4

1) Preparation of Barium Titanate Foam Ceramics Loaded with Micro/Nano Silver 5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) of EMBODIMENT 1 were soaked in solution G and kept at room temperature for 1 h to obtain barium titanate foam ceramics loaded with nano silver; then, 100 mL of aqueous glucose solution with a concentration of 20 g/L was added into the solution G and kept at room temperature for 2 h; followed by washing with deionized water and drying, successively, to obtain barium titanate foam ceramics loaded with micro/nano silver, that is modified barium titanate foam ceramics. Its scanning electron microscope image is shown in FIG. 2.

2) Preparation of Modified Barium Titanate Foam Ceramic/Cyanate Ester Resin Composite The modified barium titanate foam ceramics prepared in step 1) were placed in a mold and preheated at 160° C. in an oven; bisphenol A cyanate ester was melted at 160° C. for 1 h to obtain an solution, which was poured into the preheated modified barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, modified barium titanate foam ceramic/cyanate ester resin composite was obtained. Its plots reflecting frequency dependence of dielectric constant, dielectric loss and AC conductivity are shown in FIGS. 3, 4 and 5, respectively.

FIG. 2 gives scanning electron microscope images of barium titanate foam ceramic, dopamine-modified barium titanate foam ceramic and barium titanate foam ceramic loaded with nano silver prepared in EMBODIMENT 1 of this invention, barium titanate foam ceramic loaded with nano silver prepared in EMBODIMENT 2, and barium titanate foam ceramics loaded with micro/nano silver prepared in EMBODIMENTS 3 and 4. It can be seen that the barium titanate foam ceramic (EMBODIMENT 1) has a coating layer on the surface of barium titanate foam ceramic (EMBODIMENT 1) after treated with dopamine. After dopamine-modified barium titanate foam ceramic reacts with the ammoniacal silver solution, fine particles appear on the surface thereof, and the size and number of the particles on the surface increase with the extension of reaction time, that is the mass fraction of the deposition of silver increases (EMBODIMENT 1 and EMBODIMENT 2). After further reduction using glucose, the particle size of Ag particles translates from nanometer to micron, moreover, the silver particles become closer with the extension of reaction time (EMBODIMENT 3 and EMBODIMENT 4). At this time, by a careful observation, it can be found that the coating of sliver contains both nano and micron sizes, and these two sizes of silver particles are mosaic and accumulate with each other (EMBODIMENT 3).

Based on above mentioned of FIGS. 1 and 2, barium titanate foam ceramic prepared in this invention is a kind of pure barium titanate foam ceramic with a single chemical composition, and there is no other impurity; after loaded with micro/nano silver, the skeleton of barium titanate foam ceramic is coated with Ag particles, this changes the skeleton structure of the original barium titanate foam ceramic.

CONTROL EXAMPLE 1, preparation of barium titanate foam ceramic/cyanate ester resin composite: the barium titanate foam ceramic prepared in step 4) of EMBODIMENT 1 was placed in a mold and preheated at 160° C. in an oven; bisphenol A cyanate ester was melted at 160° C. for 1 h to obtain an solution, which was poured into the preheated barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, barium titanate foam ceramic/cyanate ester resin composite was obtained. Its plots reflecting frequency dependence of dielectric constant, dielectric loss and AC conductivity are shown in FIGS. 3, 4 and 5, respectively.

FIG. 3 is plots reflecting frequency dependence of dielectric constant of modified barium titanate foam ceramic/cyanate ester resin composites prepared in EMBODIMENTS 3 and 4 of this invention, and barium titanate foam ceramic/cyanate ester resin composite prepared in CONTROL EXAMPLE 1. As can be seen, after barium titanate foam ceramic loaded with micro/nano silver, at 100 Hz, the dielectric constant of the resultant composite increases from 83.3 (CONTROL EXAMPLE 1) to 162.4 (EMBODIMENT 3), moreover, the dielectric constant of the composite shows excellent frequency stability; with continuous extension of the reduction time of silver, the dielectric constant of composite reaches 9618.1 (EMBODIMENT 4).

FIG. 4 gives plots reflecting frequency dependence of dielectric loss of modified barium titanate foam ceramic/cyanate ester resin composites prepared in EMBODIMENTS 3 and 4, and barium titanate foam ceramic/cyanate ester resin composite prepared in CONTROL EXAMPLE 1. As can be seen, loading micro/nano silver on barium titanate foam ceramic (EMBODIMENT 3) makes the composite has significantly reduced dielectric loss. For example, at 100 Hz, the dielectric loss of barium titanate foam ceramic/cyanate ester resin composite is 0.21 (EMBODIMENT 3), but that of modified barium titanate foam ceramic/cyanate ester resin composite is only 0.01 (EMBODIMENT 4). However, when the reduction time of the silver is extended, its dielectric loss reaches 5400 (EMBODIMENT 4).

FIG. 5 is plots reflecting frequency dependence of AC conductivities of modified barium titanate foam ceramic/cyanate ester resin composites prepared in EMBODIMENTS 3 and 4, and barium titanate foam ceramic/cyanate ester resin composite prepared in CONTROL EXAMPLE 1. As can be seen in this figure, the AC conductivities of modified barium titanate foam ceramic/cyanate ester resin composites (EMBODIMENT 3 and EMBODIMENT 4) are higher than that of barium titanate foam ceramic/cyanate ester resin composite (CONTROL EXAMPLE 1), this should be attributed to the loading of micro/nano silver. In addition, the electric conductivity of the composite prepared in EMBODIMENT 4 has a typical conductor characteristic, which is mainly attributed to the various size and number of Ag loading. Therefore, compared with barium titanate foam ceramic/cyanate ester resin composite, modified barium titanate foam ceramic/cyanate ester resin composite has outstanding dielectric properties, which is originated from the change of composite structure induced by the loading with Ag.

On the basis of FIGS. 3, 4 and 5, it can be seen that compared with barium titanate foam ceramic/cyanate ester resin composite, with the same content of barium titanate ceramic, the composite based on barium titanate foam ceramic loaded with micro/nano silver (before percolation threshold) shows excellent frequency stability, higher dielectric constant and low dielectric loss. This is because the skeleton of foam ceramics is coated with micro/nano silver, improving the interface between ceramic and resin; and because the sizes of coated silver contain nano (which is not conductive) and micron sizes, and these two sizes of silver particles are mosaic and accumulate with each other, this is helpful to reduce the contact between conductive particles and cause conduction loss, so a composite with low dielectric loss was obtained.

Embodiment 5

1) Preparation of Barium Titanate Foam Ceramics Loaded with Micro/Nano Silver 5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) of EMBODIMENT 1 were soaked in solution G and kept at room temperature for 0.5 h to obtain barium titanate foam ceramics loaded with nano silver; then, 100 mL of aqueous glucose solution with a concentration of 20 g/L was added into the solution G and kept at room temperature for 1 h; followed by washing with deionized water and drying, successively, to obtain barium titanate foam ceramics loaded with micro/nano silver, that is modified barium titanate foam ceramics.

2) Preparation of Modified Barium Titanate Foam Ceramic/Cyanate Ester Resin Composite The modified barium titanate foam ceramics prepared in step 1) were placed in a mold and preheated at 160° C. in an oven; bisphenol A cyanate ester was melted at 160° C. for 1 h to obtain an solution, which was poured into the preheated modified barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, modified barium titanate foam ceramic/cyanate ester resin composite was obtained.

Embodiment 6

1) Preparation of Barium Titanate Foam Ceramics Loaded with Micro/Nano Silver 2 mL of aqueous polyvinylpyrrolidone solution with a concentration of 0.2 wt % and 3 mL of aqueous sodium alginate solution with a concentration of 0.2 wt % were added into 50 mL of a fresh ammoniacal silver solution with a concentration of 0.03 mol/L, the mixture was uniformly mixed to obtain solution G; the dopamine-modified barium titanate foam ceramics prepared in step 5) of EMBODIMENT 1 were soaked in solution G and kept at room temperature for 24 h to obtain barium titanate foam ceramics loaded with nano silver; then, 150 mL of aqueous sodium citrate solution with a concentration of 5 g/L was added into the solution G and kept at room temperature for 1 h; followed by washing with deionized water and drying, successively, to obtain barium titanate foam ceramics loaded with micro/nano silver, that is modified barium titanate foam ceramics.

2) Preparation of Modified Barium Titanate Foam Ceramic/Cyanate Ester Resin Composite The modified barium titanate foam ceramics prepared in step 1) were placed in a mold and preheated at 160° C. in an oven; bisphenol A cyanate ester was melted at 160° C. for 1 h to obtain an solution, which was poured into the preheated modified barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, modified barium titanate foam ceramic/cyanate ester resin composite was obtained.

Embodiment 7

1) Preparation of Barium Titanate Foam Ceramics Loaded with Micro/Nano Silver 5 mL of aqueous sodium alginate solution with a concentration of 0.2 wt % were added into 50 mL of a fresh ammoniacal silver solution with a concentration of 0.06 mol/L, the mixture was uniformly mixed to obtain solution G; the dopamine-modified barium titanate foam ceramics prepared in step 5) of EMBODIMENT 1 were soaked in solution G and kept at room temperature for 24 h to obtain barium titanate foam ceramics loaded with nano silver; then, 100 mL of aqueous sodium borohydride solution with a concentration of 20 g/L was added into the solution G and kept at room temperature for 2 h; followed by washing with deionized water and drying, successively, to obtain barium titanate foam ceramics loaded with micro/nano silver, that is modified barium titanate foam ceramics.

2) Preparation of Modified Barium Titanate Foam Ceramic/Cyanate Ester Resin Composite The modified barium titanate foam ceramics prepared in step 1) were placed in a mold and preheated at 160° C. in an oven; bisphenol A cyanate ester was melted at 160° C. for 1 h to obtain an solution, which was poured into the preheated modified barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, modified barium titanate foam ceramic/cyanate ester resin composite was obtained.

Embodiment 8

1) Preparation of Barium Titanate Foam Ceramics

The green body of barium titanate foam ceramics prepared in EMBODIMENT 1 was heated from room temperature to 200° C. at a rate of 2° C./min, and then raised to 600° C. at a rate of 1° C./min and maintained at 600° C. for 1 h; followed by continuously heating to 1300° C. at a rate of 5° C./min and keeping at that temperature for 2 h; after the furnace was cooled to room temperature, barium titanate foam ceramics were obtained.

2) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 0.5 g/L, and then solution F was obtained by adjusting pH to 8.5 with sodium hydroxide; barium titanate foam ceramics prepared in step 1) were soaked in solution F and kept at room temperature for 24 h; followed by washing with deionized water for several times and drying, successively, to obtain dopamine-modified barium titanate foam ceramics.

3) Preparation of Barium Titanate Foam Ceramics Loaded with Micro/Nano Silver 10 mL of aqueous sodium alginate solution with a concentration of 0.1 wt % was added into 50 mL of a fresh ammoniacal silver solution with a concentration of 0.12 mol/L, the mixture was uniformly mixed to obtain solution G; the dopamine-modified barium titanate foam ceramics prepared in step 2) were soaked in solution G and kept at room temperature for 24 h to obtain barium titanate foam ceramics loaded with nano silver; then, 100 mL of aqueous ascorbic acid solution with a concentration of 1 g/L was added into the solution G and kept at room temperature for 2 h; followed by washing with deionized water and drying, successively, to obtain barium titanate foam ceramics loaded with micro/nano silver, that is modified barium titanate foam ceramics.

4) Preparation of Modified Barium Titanate Foam Ceramic/Cyanate Ester Resin Composite The modified barium titanate foam ceramics prepared in step 3) were placed in a mold and preheated at 160° C. in an oven; bisphenol A cyanate ester was melted at 160° C. for 1 h to obtain an solution, which was poured into the preheated modified barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, modified barium titanate foam ceramic/cyanate ester resin composite was obtained.

Embodiment 9

1) Preparation of Green Body of Barium Titanate Foam Ceramics

The pretreated polyurethane sponge E in EMBODIMENT 1 was soaked in the slurry C (EMBODIMENT 1) and maintained for 5 min at room temperature; after hanging pulp, the excess slurry in the sponge was removed by extrusion, and the sponge was dried at 40° C.; repeating processes of hanging pulp and drying for 3 times, a green body of foam ceramics based on barium titanate with even coating and no blocks was obtained.

2) Preparation of Barium Titanate Foam Ceramics

The green body of barium titanate foam ceramics prepared in step 1) was heated from room temperature to 200° C. at a rate of 2° C./min, and then raised to 600° C. at a rate of 1° C./min and maintained at 600° C. for 1 h; followed by continuously heating to 1200° C. at a rate of 5° C./min and keeping at that temperature for 2 h; after the furnace was cooled to room temperature, barium titanate foam ceramics were obtained.

3) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with sodium hydroxide; barium titanate foam ceramics prepared in step 2) were soaked in solution F and kept at room temperature for 24 h; followed by washing with deionized water for several times and drying, successively, to obtain dopamine-modified barium titanate foam ceramics.

4) Preparation of Barium Titanate Foam Ceramics Loaded with Micro/Nano Silver 10 mL of aqueous polyvinylpyrrolidone solution with a concentration of 0.1 wt % was added into 50 mL of a fresh ammoniacal silver solution with a concentration of 0.3 mol/L, the mixture was uniformly mixed to obtain solution G; the dopamine-modified barium titanate foam ceramics prepared in step 3) were soaked in solution G and kept at room temperature for 0.5 h to obtain barium titanate foam ceramics loaded with nano silver; then, 25 mL of aqueous hydrazine hydrate solution with a concentration of 30 g/L was added into the solution G and kept at room temperature for 5 h; followed by washing with deionized water and drying, successively, to obtain barium titanate foam ceramics loaded with micro/nano silver, that is modified barium titanate foam ceramics.

5) Preparation of Modified Barium Titanate Foam Ceramic/Cyanate Ester Resin Composite The modified barium titanate foam ceramics prepared in step 4) were placed in a mold and preheated at 160° C. in an oven; bisphenol A cyanate ester was melted at 160° C. for 1 h to obtain an solution, which was poured into the preheated modified barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, modified barium titanate foam ceramic/cyanate ester resin composite was obtained.

Embodiment 10

1) Preparation of Green Body of Barium Titanate Foam Ceramics

The pretreated polyurethane sponge E in EMBODIMENT 1 was soaked in the slurry C (EMBODIMENT 1) and maintained for 5 min at room temperature; after hanging pulp, the excess slurry in the sponge was removed by extrusion, and the sponge was dried at 40° C.; repeating processes of hanging pulp and drying for 5 times, a green body of foam ceramics based on barium titanate with even coating and no blocks was obtained.

2) Preparation of Barium Titanate Foam Ceramics

The green body of barium titanate foam ceramics prepared in step 1) was heated from room temperature to 200° C. at a rate of 2° C./min, and then raised to 600° C. at a rate of 1° C./min and maintained at 600° C. for 1 h; followed by continuously heating to 1200° C. at a rate of 5° C./min and keeping at that temperature for 2 h; after the furnace was cooled to room temperature, barium titanate foam ceramics were obtained.

3) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with sodium hydroxide; barium titanate foam ceramics prepared in step 2) were soaked in solution F and kept at room temperature for 24 h; followed by washing with deionized water for several times and drying, successively, to obtain dopamine-modified barium titanate foam ceramics.

4) Preparation of Barium Titanate Foam Ceramics Loaded with Micro/Nano Silver 5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 3) were soaked in solution G and kept at room temperature for 12 h to obtain barium titanate foam ceramics loaded with nano silver; then, 100 mL of aqueous glucose solution with a concentration of 20 g/L was added into the solution G and kept at room temperature for 1.5 h; followed by washing with deionized water and drying, successively, to obtain barium titanate foam ceramics loaded with micro/nano silver, that is modified barium titanate foam ceramics.

5) Preparation of Modified Barium Titanate Foam Ceramic/Bismaleimide/Cyanate Ester Resin Composite The modified barium titanate foam ceramics prepared in step 4) were placed in a mold and preheated at 140° C. in an oven; 2,2'-diallyl bisphenol A, N, N-4,4'-diphenylmethane bismaleimide and bisphenol A cyanate ester (mass ratio of 18:27:5) were blended with stirring at 140° C. for 1 h to obtain an solution, which was poured into the preheated modified barium titanate foam ceramics and degassed under vacuum at 140° C. for 0.5 h; followed by curing and postcuring using the procedures of 150° C./2 h+180° C./2 h+200° C./2 h, and 220° C./8 h, successively; after slowly cooled to room temperature, modified barium titanate foam ceramic/bismaleimide/cyanate ester resin composite was obtained.

Embodiment 11

1) Preparation of Barium Titanate Foam Ceramics

The green body of barium titanate foam ceramics prepared in EMBODIMENT 1 was heated from room temperature to 200° C. at a rate of 0.5° C./min, and then raised to 600° C. at a rate of 1° C./min and maintained at 600° C. for 2 h; followed by continuously heating to 1200° C. at a rate of 5° C./min and keeping at that temperature for 2 h; after the furnace was cooled to room temperature, barium titanate foam ceramics were obtained.

2) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with aqueous ammonia solution; barium titanate foam ceramics prepared in step 1) were soaked in solution F and kept at room temperature for 24 h; followed by washing with deionized water for several times and drying, successively, to obtain dopamine-modified barium titanate foam ceramics.

3) Preparation of Barium Titanate Foam Ceramics Loaded with Micro/Nano Silver 5 mL of aqueous sodium alginate solution with a concentration of 0.2 wt % was added into 50 mL of a fresh ammoniacal silver solution with a concentration of 0.12 mol/L, the mixture was uniformly mixed to obtain solution G; the dopamine-modified barium titanate foam ceramics prepared in step 2) were soaked in solution G and kept at room temperature for 0.5 h to obtain barium titanate foam ceramics loaded with nano silver; then, 100 mL of aqueous sodium borohydride solution with a concentration of 20 g/L was added into the solution G and kept at room temperature for 2 h; followed by washing with deionized water and drying, successively, to obtain barium titanate foam ceramics loaded with micro/nano silver, that is modified barium titanate foam ceramics.

4) Preparation of Modified Barium Titanate Foam Ceramic/Bismaleimide Resin Composite The modified barium titanate foam ceramics prepared in step 3) were placed in a mold and preheated at 130° C. in an oven; 2,2'-diallyl bisphenol A and N, N-4,4'-diphenylmethane bismaleimide (mass ratio of 3:7) were blended with stirring at 130° C. for 1 h to obtain an solution, which was poured into the preheated modified barium titanate foam ceramics and degassed under vacuum at 130° C. for 0.5 h; followed by curing and postcuring using the procedures of 150° C./2 h+180° C./2 h+200° C./2 h, and 220° C./8 h, successively; after slowly cooled to room temperature, modified barium titanate foam ceramic/bismaleimide resin composite was obtained.

Embodiment 12

1) Preparation of Slurries 20 g of barium titanate (the average diameter is 100 nm) and 6 g of aqueous methyl cellulose solution with a concentration of 15 wt % were sufficiently ground to obtain a slurry A; 16 g of aqueous carboxymethyl cellulose solution with a concentration of 0.5 wt % was added into the slurry A, and the mixture was sufficiently ground to obtain a slurry B; 10 g of aqueous polyacrylamide solution with a concentration of 0.5 wt % and 6 g of aqueous polyacrylic acid amine solution with a concentration of 0.5 wt % were added into the slurry B, and the mixture was sufficiently ground to obtain a slurry C.

2) Treatment of Polyurethane Sponge

The polyurethane sponge having a specification of 25 PPI was soaked in an aqueous sodium hydroxide solution with a concentration of 10 wt %, and then heated up to 60° C. and keeping at that temperature for 3.5 h; the polyurethane sponge was taken out and washed with deionized water, followed by drying to obtain a polyurethane sponge D; at room temperature, the polyurethane sponge D was soaked in an aqueous polyethyleneimine solution with a concentration of 0.5 wt % for 3 h; then took out and removed the excess polyethyleneimine solution, after dried at 40° C., a pretreated polyurethane sponge E was obtained.

3) Preparation of Green Body of Barium Titanate Foam Ceramics

The pretreated polyurethane sponge E was soaked in the slurry C prepared in step 1) and maintained for 5 min at room temperature; after hanging pulp, the excess slurry in the sponge was removed by extrusion, and the sponge was dried at 80° C.; repeating processes of hanging pulp and drying for 4 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 5° C./min, and then raised to 600° C. at a rate of 5° C./min and maintained at 600° C. for 0.5 h; followed by continuously heating to 1000° C. at a rate of 10° C./min and keeping at that temperature for 2 h; after the furnace was cooled to room temperature, barium titanate foam ceramics were obtained.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 5 g/L, and then solution F was obtained by adjusting pH to 8.5 with sodium hydroxide; barium titanate foam ceramics prepared in step 4) were soaked in solution F and kept at room temperature for 24 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) were soaked in solution G and kept at room temperature for 2 h to obtain barium titanate foam ceramics loaded with nano silver; then, 50 mL of aqueous sodium citrate solution with a concentration of 10 g/L was added into the solution G and kept at room temperature for 2 h; followed by washing with deionized water and drying, successively, to obtain barium titanate foam ceramics loaded with micro/nano silver, that is modified barium titanate foam ceramics.

7) Preparation of Modified Barium Titanate Foam Ceramic/Cyanate Ester Resin Composite The modified barium titanate foam ceramics prepared in step 7) were placed in a mold and preheated at 160° C. in an oven; bisphenol A cyanate ester was melted at 160° C. for 1 h to obtain an solution, which was poured into the preheated modified barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, modified barium titanate foam ceramic/cyanate ester resin composite was obtained.

Embodiment 13

1) Preparation of Slurries 20 g of barium titanate (the average diameter is 30 nm) and 10 g of aqueous carboxymethyl cellulose solution with a concentration of 1 wt % and 10 g of aqueous methyl cellulose solution with a concentration of 1 wt % were sufficiently ground to obtain a slurry A; 2 g of aqueous carboxymethyl cellulose solution with a concentration of 2 wt % was added into the slurry A, and the mixture was sufficiently ground to obtain a slurry B; 10 g of aqueous polyacrylamide solution with a concentration of 1 wt % and 6 g of aqueous polyethyleneimine solution with a concentration of 1 wt % were added into the slurry B, and the mixture was sufficiently ground to obtain a slurry C.

2) Treatment of Polyurethane Sponge

The polyurethane sponge having a specification of 35 PPI was soaked in an aqueous sodium hydroxide solution with a concentration of 15 wt %, and then heated up to 60° C. and keeping at that temperature for 3.5 h; the polyurethane sponge was taken out and washed with deionized water, followed by drying to obtain a polyurethane sponge D; at room temperature, the polyurethane sponge D was soaked in a mixed solution by equal volume of aqueous carboxymethyl cellulose solution with a concentration of 1 wt % and aqueous polyethyleneimine solution with a concentration of 1 wt % for 3 h; then took out and removed the excess mixed solution of carboxymethyl cellulose solution and polyethyleneimine solution, after dried at 60° C., a pretreated polyurethane sponge E was obtained.

3) Preparation of Green Body of Barium Titanate Foam Ceramics

The pretreated polyurethane sponge E was soaked in the slurry C prepared in step 1) and maintained for 10 min at room temperature; after hanging pulp, the excess slurry in the sponge was removed by extrusion, and the sponge was dried at 50° C.; repeating processes of hanging pulp and drying for 4 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 2° C./min, and then raised to 600° C. at a rate of 1° C./min and maintained at 600° C. for 1 h; followed by continuously heating to 1000° C. at a rate of 2° C./min and keeping at that temperature for 1 h; after the furnace was cooled to room temperature, barium titanate foam ceramics were obtained.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with sodium hydroxide; barium titanate foam ceramics prepared in step 4) were soaked in solution F and kept at room temperature for 24 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous sodium alginate solution with a concentration of 0.2 wt % was added into 50 mL of a fresh ammoniacal silver solution with a concentration of 0.12 mol/L, the mixture was uniformly mixed to obtain solution G; the dopamine-modified barium titanate foam ceramics prepared in step 5) were soaked in solution G and kept at room temperature for 2 h to obtain barium titanate foam ceramics loaded with nano silver; then, 50 mL of aqueous sodium citrate solution with a concentration of 10 g/L was added into the solution G and kept at room temperature for 2 h; followed by washing with deionized water and drying, successively, to obtain barium titanate foam ceramics loaded with micro/nano silver, that is modified barium titanate foam ceramics.

7) Preparation of Modified Barium Titanate Foam Ceramic/Bismaleimide Resin Composite The modified barium titanate foam ceramics prepared in step 6) were placed in a mold and preheated at 130° C. in an oven; 2,2'-diallyl bisphenol A and N, N-4,4'-diphenylmethane bismaleimide (mass ratio of 3:7) were blended with stirring at 130° C. for 1 h to obtain an solution, which was poured into the preheated modified barium titanate foam ceramics and degassed under vacuum at 130° C. for 0.5 h; followed by curing and postcuring using the procedures of 150° C./2 h+180° C./2 h+200° C./2 h, and 220° C./8 h, successively; after slowly cooled to room temperature, modified barium titanate foam ceramic/bismaleimide resin composite was obtained.

Embodiment 14

1) Preparation of Slurries 20 g of barium titanate (the average diameter is 50 nm) and 6 g of aqueous polyvinyl alcohol solution with a concentration of 10 wt % and 10 g of aqueous carboxymethyl cellulose solution with a concentration of 1 wt % were sufficiently ground to obtain a slurry A; 5 g of aqueous carboxymethyl cellulose solution with a concentration of 2 wt % was added into the slurry A, and the mixture was sufficiently ground to obtain a slurry B; 5 g of aqueous polyacrylamide solution with a concentration of 1 wt % and 5 g of aqueous polyethyleneimine solution with a concentration of 1 wt % were added into the slurry B, and the mixture was sufficiently ground to obtain a slurry C.

2) Treatment of Polyvinyl Chloride Sponge

The polyvinyl chloride sponge having a specification of 15 PPI was soaked in an aqueous sodium hydroxide solution with a concentration of 20 wt %, and then heated up to 60° C. and keeping at that temperature for 2 h; the polyvinyl chloride sponge was taken out and washed with deionized water, followed by drying to obtain a polyvinyl chloride D; at room temperature, the polyvinyl chloride D was soaked in an aqueous carboxymethyl cellulose solution with a concentration of 0.5 wt % for 3 h; then took out and removed the excess carboxymethyl cellulose solution, after dried at 60° C., the pretreated polyvinyl chloride sponge E was obtained.

3) Preparation of Green Body of Barium Titanate Foam Ceramics

The pretreated polyvinyl chloride sponge E was soaked in the slurry C prepared in step 1) and maintained for 5 min at room temperature; after hanging pulp, the excess slurry in the sponge was removed by extrusion, and the sponge was dried at 40° C.; repeating processes of hanging pulp and drying for 4 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 0.5° C./min, and then raised to 600° C. at a rate of 5° C./min and maintained at 600° C. for 2 h; followed by continuously heating to 1200° C. at a rate of 5° C./min and keeping at that temperature for 2 h; after the furnace was cooled to room temperature, barium titanate foam ceramics were obtained.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 0.5 g/L, and then solution F was obtained by adjusting pH to 8.5 with aqueous ammonia solution; barium titanate foam ceramics prepared in step 4) were soaked in solution F and kept at room temperature for 12 h; followed by washing with deionized water for several times and drying, successively, to obtain dopamine-modified barium titanate foam ceramics.

6) Preparation of Barium Titanate Foam Ceramics Loaded with Micro/Nano Silver 10 mL of aqueous polyvinylpyrrolidone solution with a concentration of 0.1 wt % was added into 50 mL of a fresh ammoniacal silver solution with a concentration of 0.3 mol/L, the mixture was uniformly mixed to obtain solution G; the dopamine-modified barium titanate foam ceramics prepared in step 5) were soaked in solution G and kept at room temperature for 0.5 h to obtain barium titanate foam ceramics loaded with nano silver; then, 25 mL of aqueous hydrazine hydrate solution with a concentration of 30 g/L was added into the solution G and kept at room temperature for 5 h; followed by washing with deionized water and drying, successively, to obtain barium titanate foam ceramics loaded with micro/nano silver, that is modified barium titanate foam ceramics.

7) Preparation of Modified Barium Titanate Foam Ceramic/Bismaleimide/Cyanate Ester Resin Composite The modified barium titanate foam ceramics prepared in step 6) were placed in a mold and preheated at 140° C. in an oven; 2,2'-diallyl bisphenol A, N, N-4,4'-diphenylmethane bismaleimide and bisphenol A cyanate ester (mass ratio of 18:27:5) were blended with stirring at 140° C. for 1 h to obtain an solution, which was poured into the preheated modified barium titanate foam ceramics and degassed under vacuum at 140° C. for 0.5 h; followed by curing and postcuring using the procedures of 150° C./2 h+180° C./2 h+200° C./2 h, and 220° C./8 h, successively; after slowly cooled to room temperature, modified barium titanate foam ceramic/bismaleimide/cyanate ester resin composite was obtained.

Embodiment 15

1) Preparation of Slurries 20 g of barium titanate (the average diameter is 30 nm) and 24 g of aqueous methyl cellulose solution with a concentration of 1 wt % were sufficiently ground to obtain a slurry A; 4 g of aqueous hydroxyhexyl cellulose solution with a concentration of 3 wt % was added into the slurry A, and the mixture was sufficiently ground to obtain a slurry B; 16 g of aqueous polyethyleneimine solution with a concentration of 0.5 wt % was added into the slurry B, and the mixture was sufficiently ground to obtain a slurry C.

2) Treatment of Polystyrene Sponge

The polystyrene sponge having a specification of 25 PPI was soaked in an aqueous sodium hydroxide solution with a concentration of 5 wt %, and then heated up to 75° C. and keeping at that temperature for 6 h; the polystyrene sponge was taken out and washed with deionized water, followed by drying to obtain a polystyrene sponge D; at room temperature, the polystyrene sponge D was soaked in an aqueous polyethyleneimine solution with a concentration of 3 wt % for 2 h; then took out and removed the excess polyethyleneimine solution, after dried at 60° C., the pretreated polystyrene sponge E was obtained.

3) Preparation of Green Body of Barium Titanate Foam Ceramics

The pretreated polystyrene sponge E was soaked in the slurry C prepared in step 1) and maintained for 10 min at room temperature; after hanging pulp, the excess slurry in the sponge was removed by extrusion, and the sponge was dried at 50° C.; repeating processes of hanging pulp and drying for 7 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 0.5° C./min, and then raised to 600° C. at a rate of 5° C./min and maintained at 600° C. for 2 h; followed by continuously heating to 1000° C. at a rate of 10° C./min and keeping at that temperature for 5 h; after the furnace was cooled to room temperature, barium titanate foam ceramics were obtained.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with sodium hydroxide; barium titanate foam ceramics prepared in step 4) were soaked in solution F and kept at room temperature for 12 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous sodium alginate solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) were soaked in solution G and kept at room temperature for 24 h to obtain barium titanate foam ceramics loaded with nano silver; then, 100 mL of aqueous sodium borohydride solution with a concentration of 20 g/L was added into the solution G and kept at room temperature for 2 h; followed by washing with deionized water and drying, successively, to obtain barium titanate foam ceramics loaded with micro/nano silver, that is modified barium titanate foam ceramics.

7) Preparation of Modified Barium Titanate Foam Ceramic/Epoxy/Cyanate Ester Resin Composite The modified barium titanate foam ceramics prepared in step 6) were placed in a mold and preheated at 150° C. in an oven; epoxy (commercial name: E-51) and bisphenol A cyanate ester (mass ratio of 1:9) were blended with siring at 150° C. for 1 h to obtain an solution, which was poured into the preheated modified barium titanate foam ceramics and degassed under vacuum at 150° C. for 0.5 h, followed by curing and postcuring using the procedures of 160° C./2 h+180° C./2 h+200° C./2 h, and 220° C./4 h, successively; after slowly cooled to room temperature, modified barium titanate foam ceramic/epoxy/cyanate ester resin composite was obtained.

Embodiment 16

1) Preparation of Slurries 20 g of barium titanate (the average diameter is 50 nm) and 6 g of aqueous polyvinyl alcohol solution with a concentration of 15 wt % were sufficiently ground to obtain a slurry A; 16 g of aqueous hydroxyhexyl cellulose solution with a concentration of 0.5 wt % was added into the slurry A, and the mixture was sufficiently ground to obtain a slurry B; 8 g of aqueous polyacrylic acid amine solution with a concentration of 3 wt % was added into the slurry B, and the mixture was sufficiently ground to obtain a slurry C.

2) Treatment of Polyvinyl Chloride Sponge

The polyvinyl chloride sponge having a specification of 25 PPI was soaked in an aqueous sodium hydroxide solution with a concentration of 20 wt %, and then heated up to 50° C. and keeping at that temperature for 2 h; the polyvinyl chloride sponge was taken out and washed with deionized water, followed by drying to obtain a polyvinyl chloride sponge D; at room temperature, the polyvinyl chloride sponge D was soaked in an aqueous polyethyleneimine solution with a concentration of 0.5 wt % for 2 h; then took out and removed the excess polyethyleneimine solution, after dried at 70° C., the pretreated polyvinyl chloride sponge E was obtained.

3) Preparation of Green Body of Barium Titanate Foam Ceramics

The pretreated polyvinyl chloride sponge E was soaked in the slurry C prepared in step 1) and maintained for 1 min at room temperature; after hanging pulp, the excess slurry in the sponge was removed by extrusion, and the sponge was dried at 70° C.; repeating processes of hanging pulp and drying for 1 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 200° C. at a rate of 5° C./min, and then raised to 600° C. at a rate of 0.5° C./min and maintained at 600° C. for 0.5 h; followed by continuously heating to 1500° C. at a rate of 10° C./min and keeping at that temperature for 3 h; after the furnace was cooled to room temperature, barium titanate foam ceramics were obtained.

5) Preparation of Dopamine-Modified Barium Titanate Foam Ceramics

Dopamine hydrochloride was dissolved in 10 mmol/L buffer solution of Tris-HCl to prepare aqueous dopamine solution with a concentration of 2 g/L, and then solution F was obtained by adjusting pH to 8.5 with sodium hydroxide; barium titanate foam ceramics prepared in step 4) were soaked in solution F and kept at room temperature for 24 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous sodium alginate solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) were soaked in solution G and kept at room temperature for 12 h to obtain barium titanate foam ceramics loaded with nano silver; then, 50 mL of aqueous hydrazine hydrate solution with a concentration of 30 g/L and 50 mL of aqueous sodium borohydride solution with a concentration of 10 g/L were added into the solution G and kept at room temperature for 1 h; followed by washing with deionized water and drying, successively, to obtain barium titanate foam ceramics loaded with micro/nano silver, that is modified barium titanate foam ceramics.

7) Preparation of Modified Barium Titanate Foam Ceramic/Epoxy Resin Composite

The modified barium titanate foam ceramics prepared in step 6) were placed in a mold and preheated at 60° C. in an oven; epoxy (commercial name: E-51) and 2-ethyl-4-methylimidazole (mass ratio of 25:1) were blended with siring at 60° C. for 0.5 h to obtain an solution, which was poured into the preheated modified barium titanate foam ceramics and degassed under vacuum at 60° C. for 0.5 h, followed by curing and postcuring using the procedures of 80° C./2 h+100° C./2 h+120° C./2 h, and 140° C./4 h, successively; after slowly cooled to room temperature, modified barium titanate foam ceramic/epoxy resin composite was obtained.

Embodiment 17

1) Preparation of Slurries 20 g of barium titanate (the average diameter is 100 nm) and 15 g of aqueous polyvinyl alcohol solution with a concentration of 10 wt % were sufficiently ground to obtain a slurry A; 10 g of aqueous carboxymethyl cellulose solution with a concentration of 1 wt % was added into the slurry A, and the mixture was sufficiently ground to obtain a slurry B; 5 g of aqueous polyacrylic acid amine solution with a concentration of 2 wt % was added into the slurry B, and the mixture was sufficiently ground to obtain a slurry C.

2) Treatment of Polyurethane Sponge

The polyurethane sponge having a specification of 25 PPI was soaked in an aqueous sodium hydroxide solution with a concentration of 15 wt %, after heated up to 65° C., and keeping at that temperature for 3 h; the polyurethane sponge was taken out and washed with deionized water, followed by drying to obtain a polyurethane sponge D; at room temperature, the polyurethane sponge D was soaked in an aqueous polyethyleneimine solution with a concentration of 0.5 wt % for 6 h; then took out and removed the excess polyethyleneimine solution, after dried at 60° C., a pretreated polyurethane sponge E was obtained.

3) Preparation of Green Body of Barium Titanate Foam Ceramics

The pretreated polyurethane sponge E was soaked in the slurry C prepared in step 1) and maintained for 3 min at room temperature; after hanging pulp, the excess slurry in the sponge was removed by extrusion, and the sponge was dried at 40° C.; repeating processes of hanging pulp and drying for 7 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 100° C. at a rate of 2° C./min, and then raised to 500° C. at a rate of 2° C./min and maintained at 500° C. for 2 h; followed by continuously heating to 1200° C. at a rate of 8° C./min and keeping at that temperature for 3 h; after the furnace was cooled to room temperature, barium titanate foam ceramics were obtained.

5) Preparation of Dopamine-Modified Barium Titanate Foam Ceramics

Dopamine hydrochloride was dissolved in 12.5 mmol/L buffer solution of disodium hydrogen phosphate-sodium dihydrogen phosphate to prepare aqueous dopamine solution with a concentration of 2 g/L, and then solution F was obtained by adjusting pH to 8.3 with sodium hydroxide; barium titanate foam ceramics prepared in step 4) were soaked in solution F and kept at room temperature for 24 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous sodium alginate solution with a concentration of 0.2 wt % was added into 50 mL of a fresh ammoniacal silver solution with a concentration of 0.12 mol/L, the mixture was uniformly mixed to obtain solution G; the dopamine-modified barium titanate foam ceramics prepared in step 5) were soaked in solution G and kept at room temperature for 0.5 h to obtain barium titanate foam ceramics loaded with nano silver; then, 50 mL of aqueous ascorbic acid solution with a concentration of 1 g/L and 50 mL of aqueous sodium citrate solution with a concentration of 10 g/L were added into the solution G and kept at room temperature for 2 h; followed by washing with deionized water and drying, successively, to obtain barium titanate foam ceramics loaded with micro/nano silver, that is modified barium titanate foam ceramics.

7) Preparation of Modified Barium Titanate Foam Ceramic/Cyanate Ester Resin Composite The modified barium titanate foam ceramics prepared in step 6) were placed in a mold and preheated at 160° C. in an oven; 2,2-bis(4-cyanatophenyl)propane (bisphenol A cyanate ester) was melted at 160° C. for 1 h to obtain an solution, which was poured into the preheated modified barium titanate foam ceramics and degassed under vacuum at 160° C. for 0.5 h; followed by curing and postcuring using the procedures of 160° C./2 h+180° C./2 h+200° C./2 h+220° C./2 h, and 240° C./4 h, successively; after slowly cooled to room temperature, modified barium titanate foam ceramic/cyanate ester resin composite was obtained.

Embodiment 18

1) Preparation of Slurries 20 g of barium titanate (the average diameter is 100 nm) and 10 g of aqueous polyvinyl alcohol solution with a concentration of 10 wt % were sufficiently ground to obtain a slurry A; 5 g of aqueous carboxymethyl cellulose solution with a concentration of 1 wt % and 5 g of aqueous hydroxyhexyl cellulose solution with a concentration of 1 wt % were added into the slurry A, and the mixture was sufficiently ground to obtain a slurry B; 10 g of aqueous polyacrylamide solution with a concentration of 1 wt % was added into the slurry B, and the mixture was sufficiently ground to obtain a slurry C.

2) Treatment of Polyurethane Sponge

The polyurethane sponge having a specification of 25 PPI was soaked in an aqueous sodium hydroxide solution with a concentration of 20 wt %, and then heated up to 60° C. and keeping at that temperature for 3.5 h; the polyurethane sponge was taken out and washed with deionized water, followed by drying to obtain a polyurethane sponge D; at room temperature, the polyurethane sponge D was soaked in an aqueous carboxymethyl cellulose solution with a concentration of 1 wt % for 2 h; then took out and removed the excess carboxymethyl cellulose solution, after dried at 60° C., a pretreated polyurethane sponge E was obtained.

3) Preparation of Green Body of Barium Titanate Foam Ceramics

The pretreated polyurethane sponge E was soaked in the slurry C prepared in step 1) and maintained for 5 min at room temperature; after hanging pulp, the excess slurry in the sponge was removed by extrusion, and the sponge was dried at 50° C.; repeating processes of hanging pulp and drying for 4 times, a green body of foam ceramics based on barium titanate with even coating and no blocks was obtained.

4) Preparation of Barium Titanate Foam Ceramics

The green body of barium titanate foam ceramics prepared in step 3) was heated from room temperature to 300° C. at a rate of 2° C./min, and then raised to 700° C. at a rate of 1° C./min and maintained at 700° C. for 0.5 h; followed by continuously heating to 1300° C. at a rate of 5° C./min and keeping at that temperature for 2 h; after the furnace was cooled to room temperature, barium titanate foam ceramics were obtained.

5) Preparation of Dopamine-Modified Barium Titanate Foam Ceramics

Dopamine hydrochloride was dissolved in 15 mmol/L buffer solution of disodium hydrogen phosphate-sodium dihydrogen phosphate to prepare aqueous dopamine solution with a concentration of 5 g/L, and then solution F was obtained by adjusting pH to 8.8 with sodium hydroxide; barium titanate foam ceramics prepared in step 4) were soaked in solution F and kept at room temperature for 24 h; followed by washing with deionized water for several times and drying, successively, to obtain dopamine-modified barium titanate foam ceramics.

6) Preparation of Barium Titanate Foam Ceramics Loaded with Micro/Nano Silver 5 mL of aqueous polyvinylpyrrolidone solution with a concentration of 0.2 wt % was added into 50 mL of a fresh ammoniacal silver solution with a concentration of 0.06 mol/L, the mixture was uniformly mixed to obtain solution G; the dopamine-modified barium titanate foam ceramics prepared in step 5) were soaked in solution G and kept at room temperature for 0.5 h to obtain barium titanate foam ceramics loaded with nano silver; then, 50 mL of aqueous sodium citrate solution with a concentration of 10 g/L, 50 mL of aqueous ascorbic acid solution with a concentration of 1 g/L and 50 mL of aqueous glucose solution with a concentration of 10 g/L were added into the solution G and kept at room temperature for 2 h; followed by washing with deionized water and drying, successively, to obtain barium titanate foam ceramics loaded with micro/nano silver, that is modified barium titanate foam ceramics.

7) Preparation of Modified Barium Titanate Foam Ceramic/Epoxy Resin Composite

The modified barium titanate foam ceramics prepared in step 6) were placed in a mold and preheated at 60° C. in an oven; epoxy (commercial name: E-51) and 2-ethyl-4-methylimidazole (mass ratio of 25:1) were blended with siring at 60° C. for 0.5 h to obtain an solution, which was poured into the preheated modified barium titanate foam ceramics and degassed under vacuum at 60° C. for 0.5 h, followed by curing and postcuring using the procedures of 80° C./2 h+100° C./2 h+120° C./2 h, and 140° C./4 h, successively; after slowly cooled to room temperature, modified barium titanate foam ceramic/epoxy resin composite was obtained.

What we claim:

1. A preparation method of modified barium titanate foam ceramic/thermosetting resin composites, comprising the following steps:
(1) by weight, 100 parts of a nano barium titanate and 30 to 120 parts of an aqueous solution of an organic binder having a concentration of 1 to 15 wt % are ground to obtain a slurry (A); 10 to 80 parts of an aqueous solution of an organic rheological agent having a concentration of 0.5 to 3 wt % are added into the slurry (A) to form a first mixture, and the first mixture is ground to obtain a slurry (B); 20 to 80 parts of an aqueous solution of an organic dispersant having a concentration of 0.5 to 3 wt % are added into the slurry (B) to form a second mixture, and the second mixture is ground to obtain a slurry (C); said organic binder is one or more selected from the group consisting of polyvinyl alcohol, carboxymethyl cellulose and methyl cellulose; said organic rheological agent is one or more selected from the group consisting of carboxymethyl cellulose and hydroxyhexyl cellulose; said organic dispersant is one or more selected from the group consisting of polyacrylamide, polyethyleneimine and polyacrylic acid amine;
(2) a polymer sponge having 15 to 35 pores per inch is soaked in an aqueous solution of sodium hydroxide having a concentration of 5 to 20 wt %, and then heated up to 50 to 75° C. and kept at that temperature for 2 to 6 h, the polymer sponge is taken out and washed with deionized water, followed by drying to obtain a polymer sponge (D); at room temperature, the polymer sponge (D) is soaked in an aqueous surfactant solution having a concentration of 0.5 to 3 wt % for 2 to 6 h, then taken out to remove an excess surfactant, after being dried at 40 to 80° C., a pretreated polymer sponge (E) is obtained; a polymer material of said polymer sponge is selected from the group consisting of polyurethane, polystyrene, and polyvinyl chloride; said surfactant is one or more selected from the group consisting of carboxymethyl cellulose and polyethyleneimine;
(3) said pretreated polymer sponge (E) is soaked in the slurry (C) prepared in step (1) for 1 to 10 min at room temperature, after a draining process, an excess slurry in the pretreated polymer sponge (E) is removed by extrusion, and the pretreated polymer sponge (E) is dried at 40 to 80° C.; repeating the draining process and drying for 1 to 7 times, a green body of foam ceramics based on barium titanate is obtained;
(4) said green body of foam ceramics based on barium titanate prepared in step (3) is heated from room temperature to 100-300° C. at a rate of 0.5-5° C./min, and then heated to 500-700° C. at a rate of 0.5-5° C./min and maintained at that temperature for 0.5-2 h, followed by continuously heating to 1000-1500° C. at a rate of 2-10° C./min and keeping at that temperature for 1-5 h, after cooling to room temperature, barium titanate foam ceramics are obtained;
(5) using a buffering agent or a buffer, water and dopamine hydrochloride to prepare a dopamine aqueous solution having a concentration of 0.5-10 g/L; of which a pH value is adjusted to 8.3-8.8 with an alkali to obtain a solution (F); the barium titanate foam ceramics prepared in step (4) are soaked in the solution (F) and kept at room temperature for 1 to 24 h, followed by washing with deionized water and drying successively, to obtain dopamine-modified barium titanate foam ceramics;

(6) by volume, 4 to 20 parts of a stabilizer aqueous solution having a concentration of 0.1-1 wt % are added into 100 parts of an ammoniacal silver solution having a concentration of 0.03-0.3 mol/L to form a third mixture, the third mixture is uniformly mixed to obtain a solution (G); the dopamine-modified barium titanate foam ceramics prepared in step (5) are soaked in the solution (G) and kept at room temperature for 0.5-24 h to obtain barium titanate foam ceramics loaded with nano silver, into which 50-300 parts of a reducing agent aqueous solution having a concentration of 1-30 g/L are added and kept at room temperature for 0.1-5 h, followed by washing with deionized water and drying successively, to obtain modified barium titanate foam ceramics; said stabilizer is one or more selected from the group consisting of polyvinylpyrrolidone and sodium alginate; said reducing agent is one or more selected from the group consisting of hydrazine hydrate, sodium citrate, sodium borohydride, glucose and ascorbic acid;

(7) a molten and thermocurable resin is poured into the modified barium titanate foam ceramics prepared in step (6), after pores of the modified barium titanate foam ceramics are fully permeated with the resin, thermocuring and postprocessing are conducted, and the modified barium titanate foam ceramic/thermosetting resin composites are obtained.

2. The preparation method of modified barium titanate foam ceramic/thermosetting resin composites according to claim 1, wherein an average diameter of said nano barium titanate is less than or equal to 100 nm.

3. The preparation method of modified barium titanate foam ceramic/thermosetting resin composites according to claim 1, wherein said buffering agent or buffer is Tris-HCl, or disodium hydrogen phosphate-sodium dihydrogen phosphate buffer.

4. The preparation method of modified barium titanate foam ceramic/thermosetting resin composites according to claim 1, wherein said alkali is sodium hydroxide, or an aqueous ammonia solution.

5. The preparation method of modified barium titanate foam ceramic/thermosetting resin composites according to claim 1, wherein the process conditions of thermocuring and postprocessing are selected based on the thermocurable resin being used.

6. The preparation method of modified barium titanate foam ceramic/thermosetting resin composites according to claim 1, wherein said thermosetting resin is a resin which can be self-cured by heat, or a resin system consisting of a curing agent and a resin which cannot be self-cured by heat.

7. The preparation method of modified barium titanate foam ceramic/thermosetting resin composites according to claim 6, wherein said resin which can be self-cured by heat is one or more selected from the group consisting of bismaleimide resin and cyanate ester resin.

8. The preparation method of modified barium titanate foam ceramic/thermosetting resin composites according to claim 6, wherein said resin which cannot be self-cured by heat is an epoxy resin.

* * * * *